US012797808B2

(12) United States Patent
Kelly et al.

(10) Patent No.: US 12,797,808 B2
(45) **Date of Patent: *Nov. 17, 2026**

(54) INTERACTIVE MICROBUBBLE-PRODUCING DEVICE

(71) Applicant: LIGHTUPTOYS.COM LLC, Sellersburg, IN (US)

(72) Inventors: Joshua C. Kelly, New Albany, IN (US); Christopher D. Kelly, New Albany, IN (US); Max Armendariz Lalama, Sellersburg, IN (US)

(73) Assignee: LightUpToys.com LLC, Sellersburg, IN (US)

(*) Notice: Subject to any disclaimer, the term of this patent is extended or adjusted under 35 U.S.C. 154(b) by 391 days.

This patent is subject to a terminal disclaimer.

(21) Appl. No.: 18/417,122

(22) Filed: Jan. 19, 2024

(65) Prior Publication Data

US 2024/0149226 A1 May 9, 2024

Related U.S. Application Data

(63) Continuation-in-part of application No. 17/455,350, filed on Nov. 17, 2021, now Pat. No. 11,918,931, (Continued)

(51) Int. Cl.

*B01F 23/232* (2022.01)
*B01F 23/237* (2022.01)
*B01F 23/2373* (2022.01)
*F21S 10/00* (2006.01)
*A63J 5/02* (2006.01)

(Continued)

(52) U.S. Cl.
CPC ........ *B01F 23/232* (2022.01); *B01F 23/2373* (2022.01); *B01F 23/237611* (2022.01); (Continued)

(58) Field of Classification Search
CPC ......... A63H 33/22; A63H 33/28; A63J 5/028; B01F 23/232; B01F 23/2373; (Continued)

(56) References Cited

U.S. PATENT DOCUMENTS 3,323,250 A 6/1967 Gibbons
4,923,426 A 5/1990 Klundt
(Continued)

*Primary Examiner* — Charles S Bushey
(74) *Attorney, Agent, or Firm* — Jessica C. Ronald; Scott R. Cox

(57) ABSTRACT

A device that creates micro sized bubbles that resemble snow. The microbubble-producing device includes a shaft with a microbubble-producing solution reservoir connected to one end and a housing connected to a second end. The housing contains a motor, a pump, and an air-producing device, which are electrically connected to control circuitry. The device includes a two-way wireless communication system that interacts with a nearby fixture. An air duct is connected on one end to the air-producing device and another end to a microbubble emitter. The emitter is hollow and includes an exterior wall. Secured to an inner surface of the wall is a shelf, which contains at least one orifice. A microbubble-producing solution input channel is a tubular structure with a first end submerged within the microbubble-producing solution reservoir and a second end connected to the shelf through the wall of the emitter.

20 Claims, 12 Drawing Sheets

Related U.S. Application Data which is a continuation-in-part of application No. 17/335,447, filed on Jun. 1, 2021, now Pat. No. 12,097,447.

(51) Int. Cl.

| | |
|---|---|
| *F21V 23/04* | (2006.01) |
| *F21W 121/00* | (2006.01) |
| *F21Y 115/10* | (2016.01) |

(52) U.S. Cl.

CPC ............ *F21S 10/002* (2013.01); *A63J 5/028* (2013.01); *F21V 23/045* (2013.01); *F21W 2121/006* (2013.01); *F21Y 2115/10* (2016.08)

(58) Field of Classification Search

CPC ........... B01F 23/237611; F21S 10/002; F21V 23/045; F21W 2121/006; F21Y 2115/10

See application file for complete search history.

(56) References Cited

U.S. PATENT DOCUMENTS

| | | | | |
|---|---|---|---|---|
| 11,918,931 | B2 * | 3/2024 | Kelly | A63J 5/028 |
| 12,097,447 | B2 * | 9/2024 | Kelly | A63H 33/22 |
| 12,330,084 | B2 * | 6/2025 | Kelly | A63H 13/005 |
| 12,403,411 | B2 * | 9/2025 | Kelly | A63H 30/04 |
| 12,544,682 | B2 * | 2/2026 | Kelly | A63H 27/10 |
| 12,551,817 | B2 * | 2/2026 | Kelly | A63H 33/28 |
| 2016/0018083 | A1 | 1/2016 | Kelly et al. | |
| 2020/0091746 | A1 * | 3/2020 | Chien | H01R 25/006 |
| 2022/0049842 | A1 | 2/2022 | Kelly et al. | |
| 2023/0111031 | A1 | 4/2023 | Kelly et al. | |
| 2023/0277953 | A1 | 9/2023 | Kelly et al. | |
| 2023/0277954 | A1 | 9/2023 | Kelly et al. | |
| 2024/0058715 | A1 | 2/2024 | Kelly et al. | |
| 2024/0066424 | A1 | 2/2024 | Kelly et al. | |

* cited by examiner

INTERACTIVE MICROBUBBLE-PRODUCING DEVICE

CROSS-REFERENCE TO RELATED APPLICATION

This application is a continuation-in-part application of and claims benefit of U.S. application Ser. No. 17/455,350 filed on Nov. 17, 2021, now U.S. Pat. No. 11,918,931 issued on Mar. 5, 2024, which was a continuation-in-part of claiming the benefit of U.S. Ser. No. 17/335,447 filed on Jun. 1, 2021, now U.S. Pat. No. 12,097,447 issued Sep. 24, 2024. All publications, patents and patent applications referred to herein are incorporated by reference in their entirety.

FIELD OF THE INVENTION

The device relates to a bubble-producing device. More specifically, it relates to an electrical bubble-producing device that creates small or micro-sized bubbles that resemble snow.

BACKGROUND

Bubble-producing devices and electrical bubble producing devices are known. However, many known devices leak from the overproduction of bubbles or even during normal operations. Accordingly, the devices become less useful or even nonfunctional over time because this excess solution leaks onto the electrical components of the device. Moreover, the excess solution leaks onto a user's hands or the floor, leading to a messy, non-user-friendly device. This leakage also results in large quantities of bubble solution being wasted, which necessitates frequent refilling. Moreover, many known devices do not have a mechanism for collecting this excess solution and recirculating it back through the device. In furtherance, many of these devices clog due to leakage of excess solution and/or due to the drip rate of solution per minute being too high.

Furthermore, these bubble-producing devices only create large or normal-sized bubbles, rather than small or microbubbles. The creation of small or microbubbles, which have the appearance of snow, is a desirable feature for these devices.

Foam-producing devices are also known. However, these devices use a specialized foam solution to create the foam. When this foam solution leaks onto the ground, the ground becomes slippery, which poses a safety risk to a user and third parties. Further, these foam devices merely produce a foam-like solution, rather than the more desirable small or microbubbles.

Furthermore, known devices are not capable of receiving a signal to activate said microbubble production and transmitting a congruent or distinct signal to the fixture to produce the same microbubble production and/or a different feature or effect.

SUMMARY OF INVENTION

There is a microbubble-producing device that includes a microbubble-producing solution reservoir that is connected to a housing via a shaft. The housing contains a motor, a pump, and an air-producing device, which are electrically connected to a power source. Connected to the air-producing device is an air duct, which is connected on a second end to a microbubble emitter. The emitter includes a wall surrounding a hollow interior, wherein a shelf with at least one orifice is secured within the hollow interior to an inner surface of the wall. A channel with a tubular structure and two ends is submerged within the microbubble-producing solution reservoir on one end and is connected on the other end to the shelf through the wall of the emitter. The device includes a two-way wireless communication system, including receiver and a transmitter. Further, the device is configured to activate via proximity detection sensor located within the device. The device transmits and receives signals from a fixture to trigger a congruent and/or different effect in the fixture and the device simultaneously.

DETAILED DESCRIPTION OF THE DRAWINGS

FIGS. 1-8 show varying perspectives of a microbubble-producing device 10. The microbubble-producing device includes a microbubble-producing solution reservoir 20 that is connected to a housing 50 via a shaft 30.

The solution reservoir 20 contains liquid, such as bubble solution, that creates microbubbles. The bubble solution is preferably non-toxic and is advantageous over a foam solution because it is less slippery when it lands on the ground. The reservoir preferably has a flat bottom, so the device can be placed on a surface and not tip over. The reservoir can vary in size depending on the overall size of the device. The microbubble-producing device is handheld, or standalone, for instance as a life size fixture for use within amusement or theme parks. The overall size of the elements disclosed herein to create the microbubbles are scaled to the size of the respective embodiment. The reservoir is refillable, which is advantageous as the device can be used indefinitely.

Figure 3:
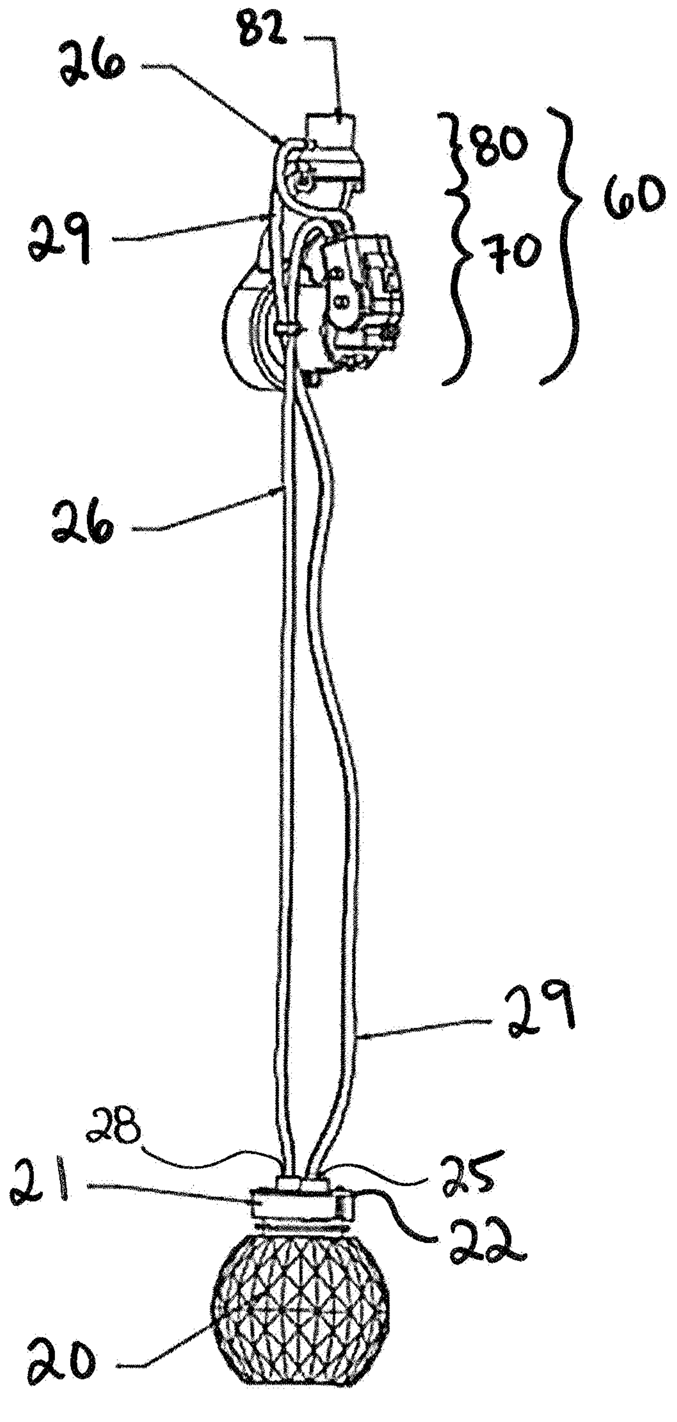
FIG. 3 is a back, perspective view of the internal elements of the device shown in FIG. 1 including a capped microbubble-producing solution reservoir with a microbubble solution input channel leading through a capillary bubble system to a microbubble emitter and a recirculation channel leading from the microbubble emitter to the solution reservoir.
Figure 12:
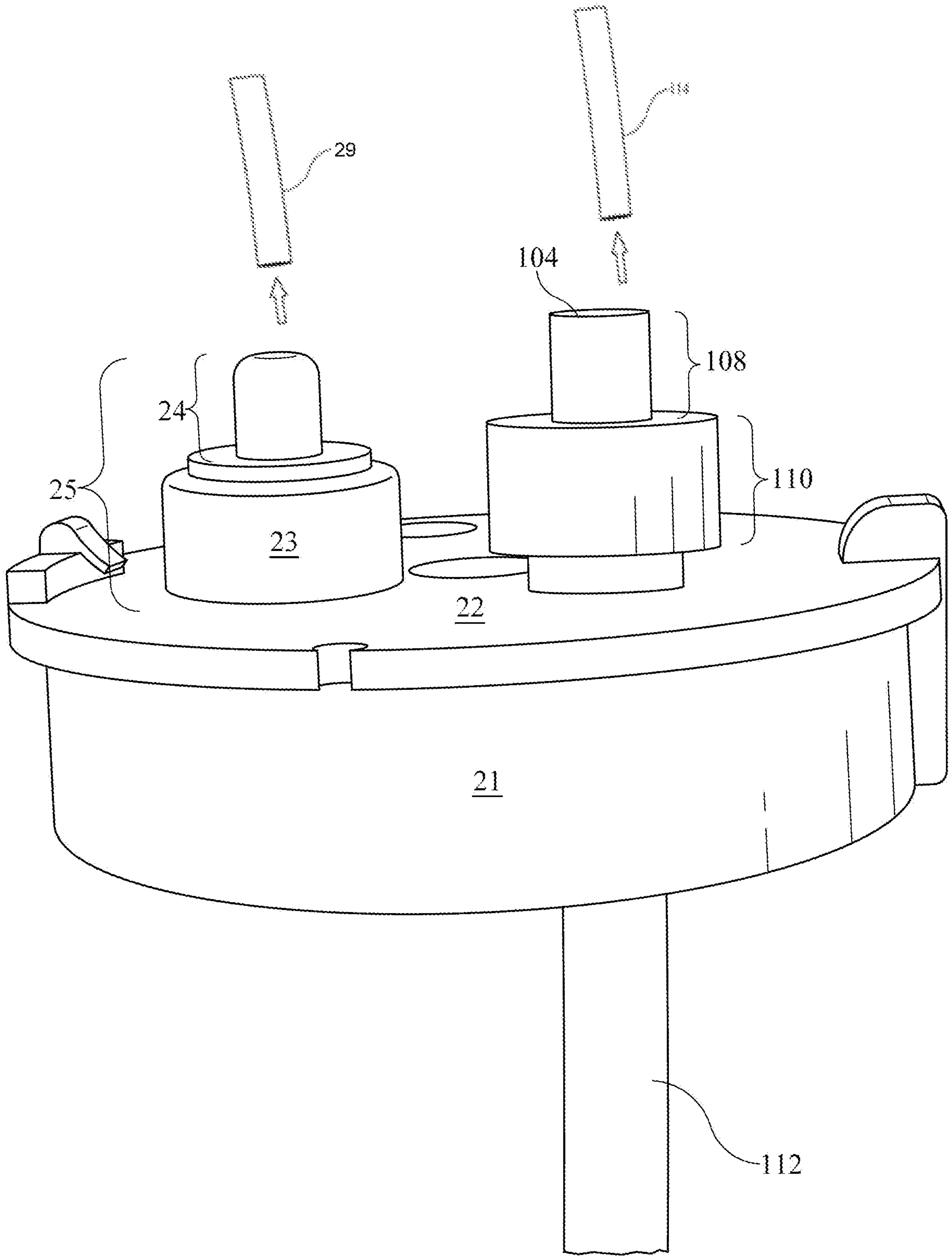
FIG. 12 is a front view of a microbubble-producing solution reservoir cover connected to the converter and larger diameter piece of the microbubble solution input channel shown in FIG. 9 and to a recirculation channel connector.

As shown in FIG. 3, the reservoir 20 includes a cover 22, that connects to a top portion thereof, and prevents the solution from spilling out of the reservoir into the shaft 30, for example, if a user tips the device upside down. As shown in FIG. 12, one way in which the cover connects to the reservoir is via sides 21 that protrude downward from the cover and secure within or around the reservoir. The cover includes an opening 28 into which the solution input channel 26 is secured. Solution within the reservoir is pumped therefrom and through the microbubble solution input channel. The solution input channel is connected to the opening by conventional methods, such as being snug fit within the opening. This end of the solution input channel is located within the reservoir and submerged within the solution located therein.

Figure 9:
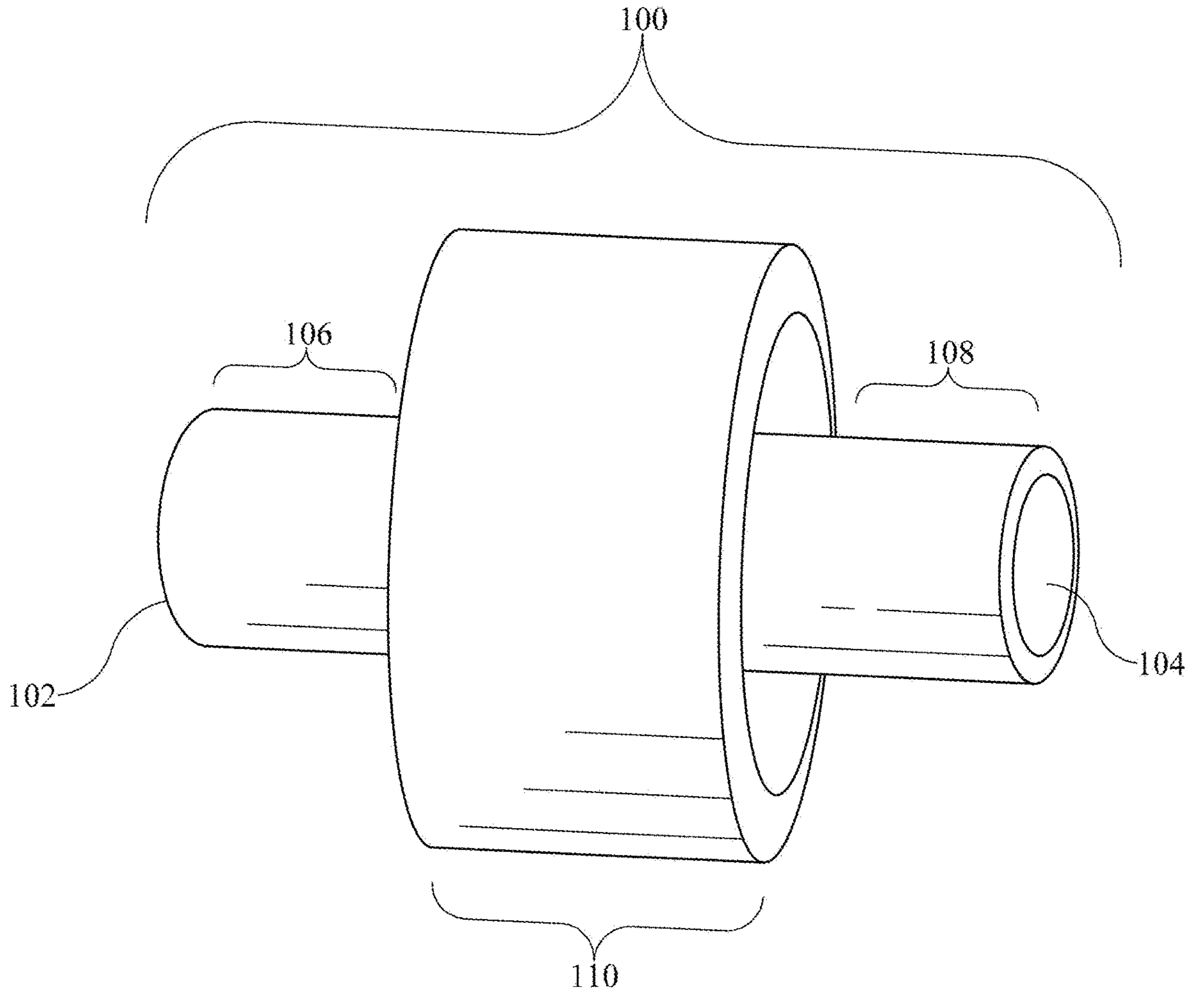
FIG. 9 is a side view of a converter that is used with a microbubble solution input channel of the device shown in FIG. 1.
Figure 10:
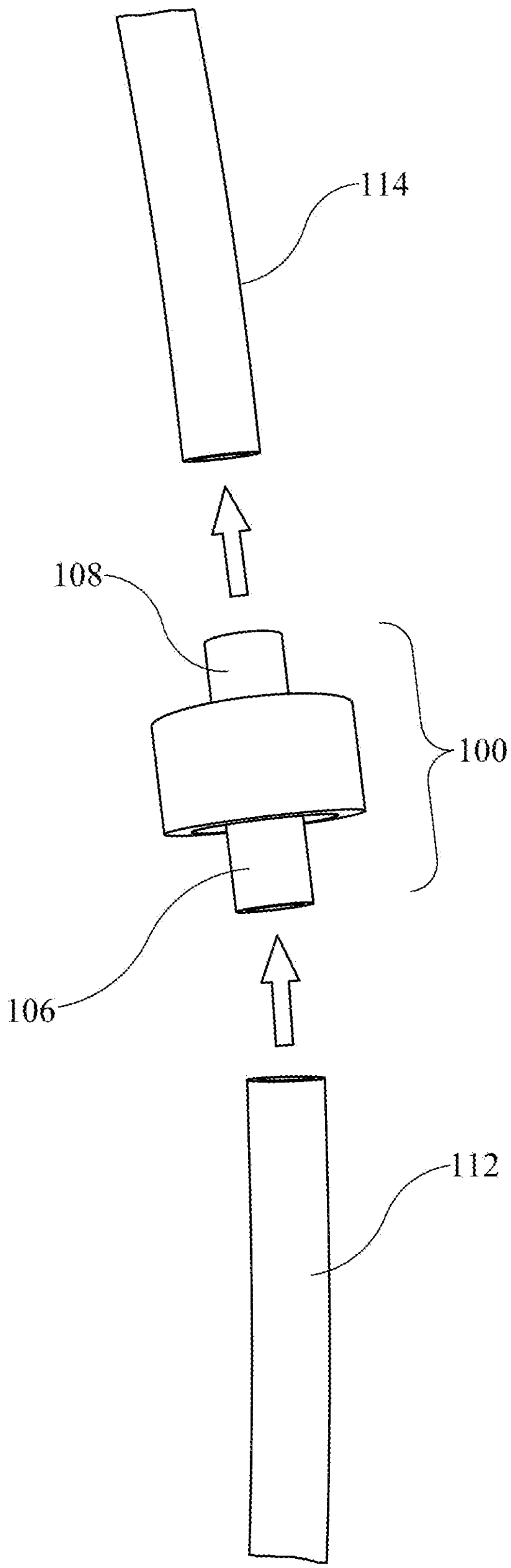
FIG. 10 is a front view of the converter shown in FIG. 9 with a microbubble solution input channel that has two pieces with different diameters.
Figure 11:
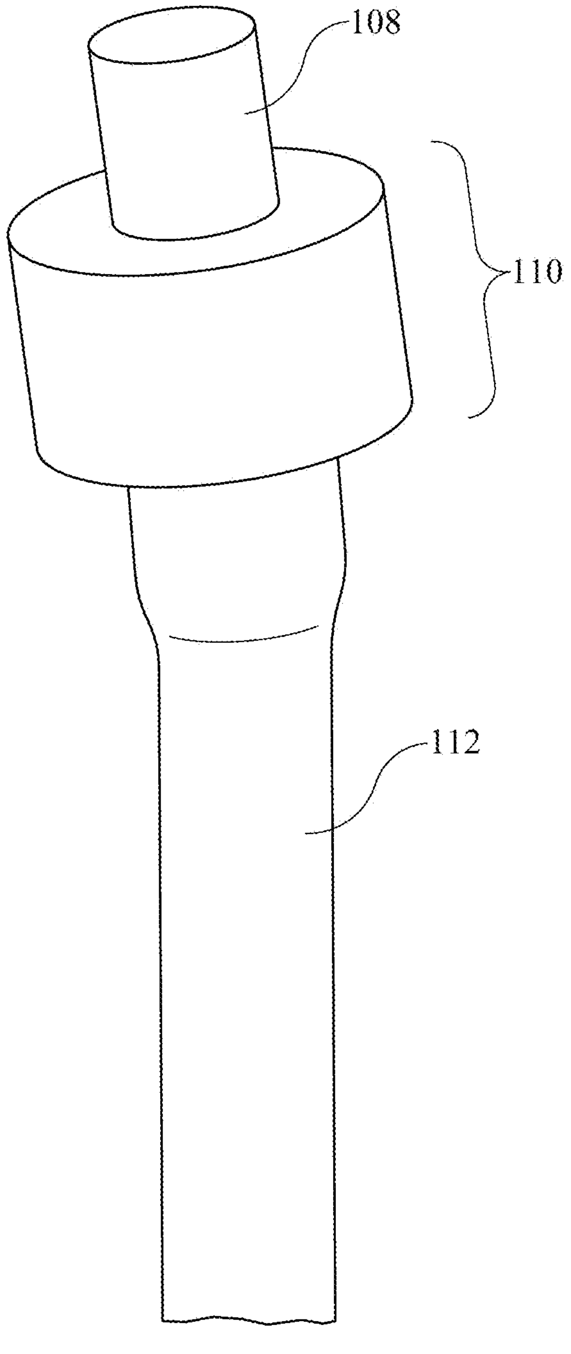
FIG. 11 is a front view of the converter shown in FIG. 9 connected to a larger diameter piece of the microbubble solution input channel.

As shown in FIG. 12, a converter 100 is secured within the opening 28 of the cover 22 and is another embodiment of how the microbubble solution input channel 26 is secured within the cover. As shown in FIG. 9, the converter includes a first end 102 and a second end 104. The first end includes a tip 106 and the second end includes a tip 108. In this embodiment, the solution input channel includes two tubular portions of differing diameters that are connected via the converter. As shown in FIGS. 10-12, the larger diameter channel 112 connects to the tip of the first end of the converter. The larger diameter channel preferably has a larger inner diameter through which the solution is pumped. The end of the larger diameter channel that is not connected to the converter is submerged within the solution in the reservoir 20. The converter can be located anywhere within the length of the solution input channel but is preferably connected to or secured into the opening in the cover of the reservoir. The converter is form-fitted into this opening or secured, for instance, via glue.

The tip of the second end of the converter is connected to a smaller diameter solution channel 114 that is of a smaller diameter than the larger diameter channel. The smaller channel is reduced in diameter from the larger channel by at least ten percent, preferably about ten to seventy percent, most preferably about ten to fifty percent. The diameter of the smaller diameter solution channel 114 is of a reduced size to reduce the quantity of solution that passes through the channel, which ultimately produces the desired drip rate of the solution onto a shelf 90 of the microbubble emitter 80. The converter 100 functions to reduce the quantity of the solution and the size of the opening through which the solution passes. The end of the smaller diameter channel that is not connected to the converter extends vertically from the reservoir, through the shaft 30 and the gearbox and pump and connects to a nozzle 96 secured through the chassis 82 of the bubble emitter 80.

As shown in FIGS. 9-12, the converter 100 includes a middle body portion 110 that is located between the tips 106, 108 of the converter. The converter is molded as one continuous piece during production. The larger and smaller diameter solution channels 106, 108 are suction fitted onto the respective tips of the converter and can be further secured by other methods. The middle body portion aids in this securement into the cover 22.

Figure 4:
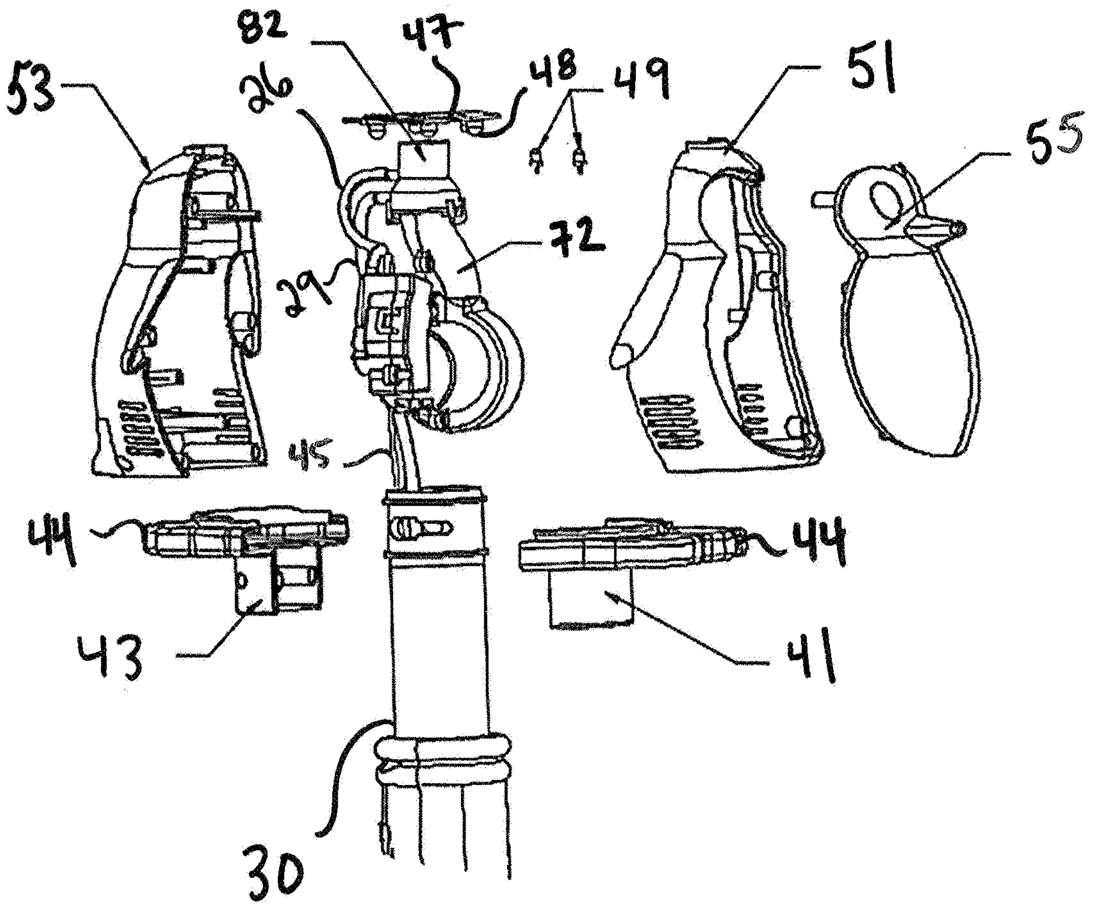
FIG. 4 is a partially exploded, side view of a top portion of the device shown in FIG. 1.
Figure 5:
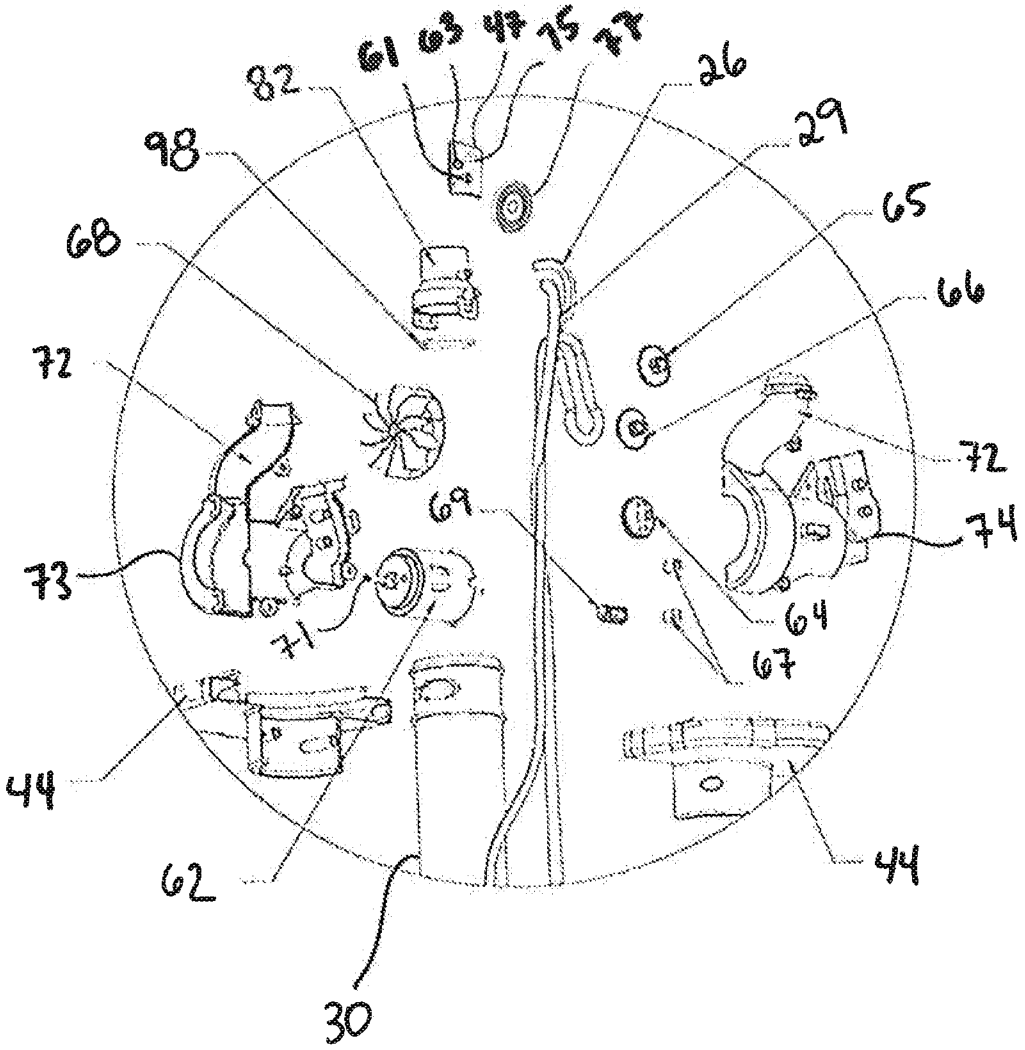
FIG. 5 is an exploded, front view of the capillary bubble system that is secured within the housing of the device shown in FIG. 1.

The tubular structure of the channel 26 aids in producing the preferred drip rate of the solution onto the shelf 90 of the microbubble emitter 80 to create the desired number and quality of microbubbles. As shown in FIGS. 3-5, the solution input channel includes a tubular structure that extends vertically from the reservoir, through the shaft 30 and the gearbox and pump and connects to a nozzle 96 secured through the chassis 82 of the bubble emitter 80. In use, the solution is pumped from the reservoir through the solution input channel via the pump and creates microbubbles, which are emitted out of the microbubble emitter 80.

As shown in FIGS. 3 and 12, the cover 22 of the reservoir 20 also includes a solution recirculation channel 29 that connects to the cover 22 of the reservoir 20 via a connector 25. This connector includes a tip 24 that is connected to the cover by a body portion 23. As shown in FIG. 3, the recirculation channel includes a tubular structure that connects on one end to a nozzle 99 secured through a lower portion of a chassis 82 of the microbubble emitter 80. The channel runs vertically downward through the shaft 30 to the reservoir. Advantageously, excess solution produced during the operation of the device 10 is recycled into the reservoir for reuse. Accordingly, excess solution is used and not wasted. The body portion of the connector includes a ball valve or ball bearing, which is not shown, so if a user turns the device upside down, the liquid does not leak out of the reservoir through the recirculation channel. Moreover, a converter 100, as discussed above, can be used with the solution recirculation channel rather than the connector.

Figure 1:
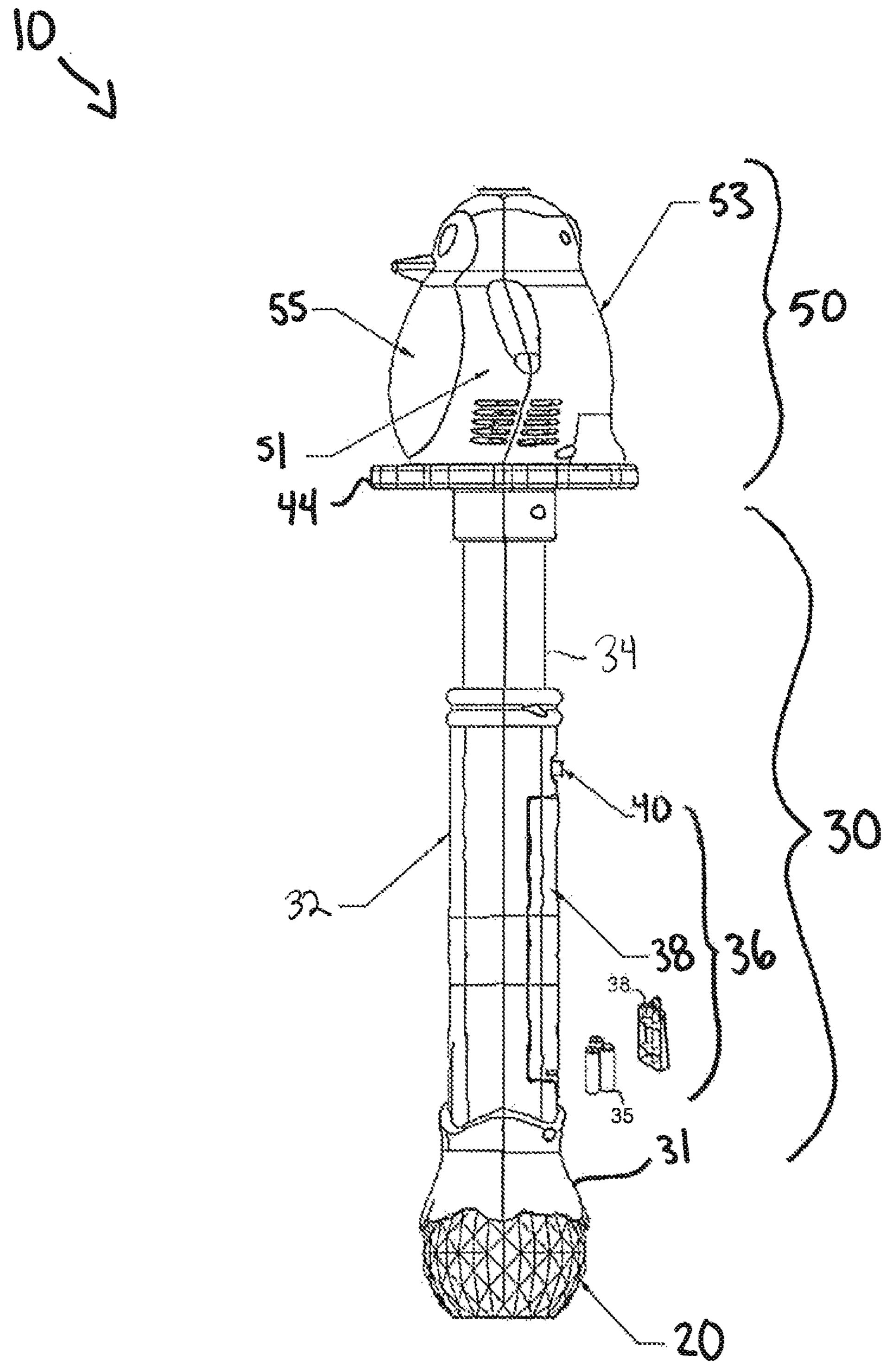
FIG. 1 is a side view of one embodiment of a microbubble-producing device.
Figure 2:
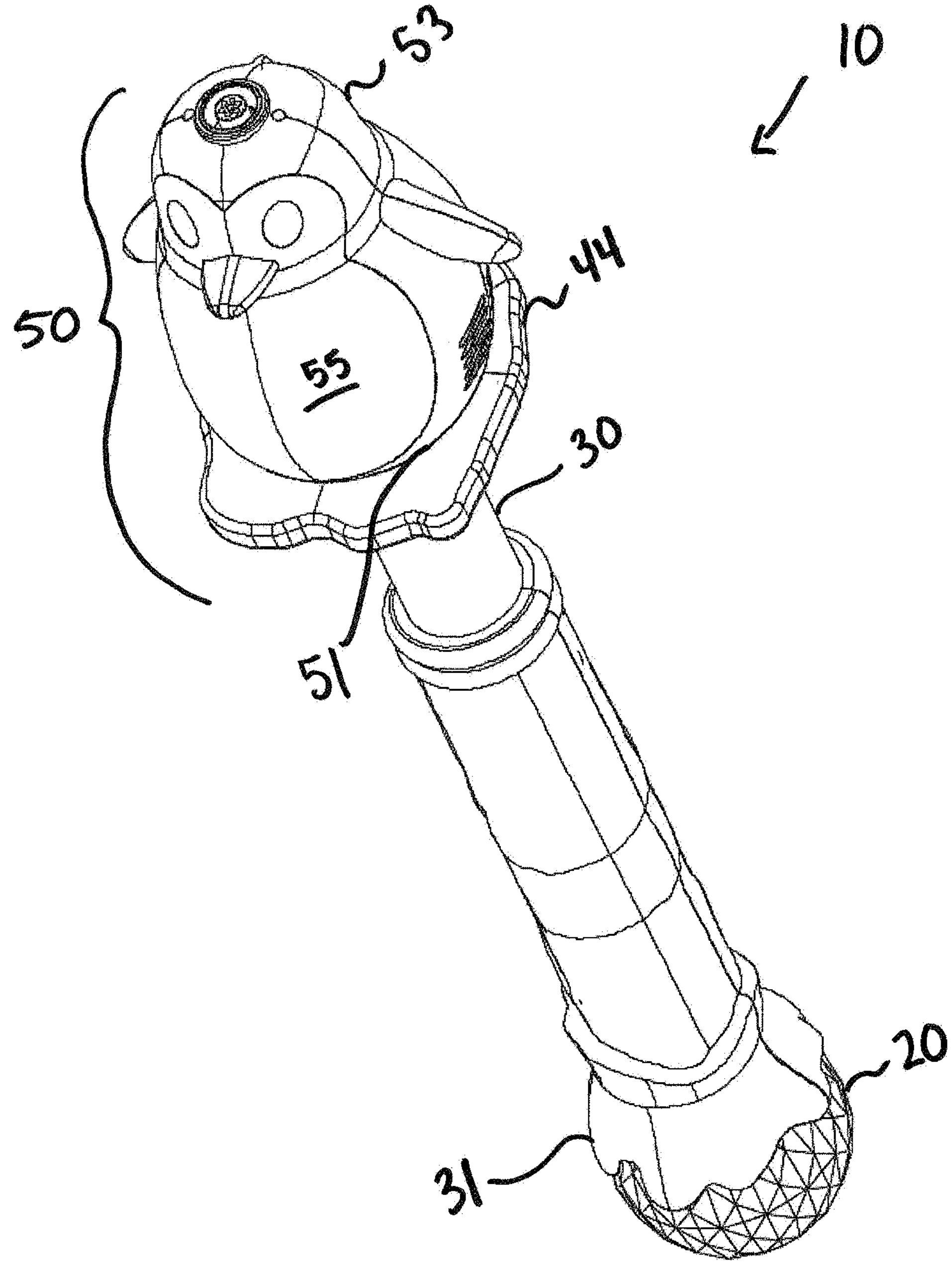
FIG. 2 is a top, perspective view of the device shown in FIG. 1.

The reservoir is connected to the shaft 30 by any conventional securing system, for instance by twisting or rotating the reservoir onto the shaft, as shown in FIG. 3. As shown in FIGS. 1-2, a further decorative cover 31, which in this embodiment looks like melting snow, can be secured around the connection of the reservoir to the shaft. This further aids in the securement of the shaft to the reservoir.

As shown in FIGS. 1 and 2, the shaft 30 is enclosed and is designed to act as a handle for the user to comfortably hold the device 10. The shaft is preferably made of a lightweight, but durable, material, such as plastic that can withstand being dropped without breaking. The shaft is hollow and can be made of one monolithic piece or a front 32 and back cover 34, which are secured together, for instance via screws. The shaft preferably includes a power source for the operation of the device, although the power source can be located anywhere within the device. The power source is batteries 35, such as 3xAA or 4xA batteries, which are secured within a battery compartment 36, as shown in FIG. 1, which is located within the back cover of the shaft. The battery compartment includes a casing 38 that secures the batteries within the compartment, for instance via screws. The batteries are electrically connected to a switch 40 that is palpable to a user through an outlet located on a surface of the shaft. This switch is multi-functional, such as a three-way slide switch, and controls multiple settings of various electrical/electronic operations of the device via preprogramming and being electrically connected to control circuitry. For example, as shown in FIG. 4, the device includes various LEDs 48, 49 secured therein, which LEDs vary in color, luminosity, and intensity and which are electrically connected via wiring 45 to the control circuitry. In one manner of operation, when a user pushes the switch once, it illuminates all the LEDs. If a user pushes the switch again, the LEDs flicker. If the user pushes the switch again, the LEDs change color. These functions are not meant to be exhaustive or exclusive. Furthermore, the switch can control other functions of the device, such as the speed at which the microbubbles are produced. In addition, the number of microbubbles produced at a time can be controlled and vary between settings. These settings include, for example, a blizzard or flurry mode. Furthermore, a speaker 77 or vibrational element is present within the device. Thus, the switch would control the timing of a song playing within the device, which song may be coordinated with the LEDs to produce a light, microbubble and song show.

As shown in FIG. 5, the device 10 includes circuitry or control circuitry 47, such as an integrated circuit with a printed circuit board and/or microcontroller unit soldered and electrically connected thereto. This circuitry controls the activation, timing, and related features of the illumination of the LEDs and the production of microbubbles. Moreover, the circuitry includes a proximity detection sensor 61, so the device is automatically activated when it is within a proximity of a sensing area, such as, for example, via RFID, infrared or other types of wireless communication means, which sense location, proximity or other wireless operations which provide instructions for or instruct illumination or other various functions of the device such as timing and amount and timing of microbubble production and illumination of LEDS. Such devices include instructions and circuitry operable to detect location in respect to a transmitted beacon. For example, when the device is within a proximity of a nearby display, feature attraction of other location within an amusement of theme park, it automatically activates, i.e., produces microbubbles and/or illuminates in a predetermined sequence. When the nearby fixture transmits a unique beacon, it is received by the device causing it to illuminate or produce microbubbles in a predetermined sequence or pattern, which is unique to the signal sent by the fixture. Other possible automated instructions include emitting colors, playing predefined audio stored in memory of the device through the speaker 77 located within the device, playing signals which are streamed and received by the integrated receiver, vibration and/or similar functionalities. Furthermore, the proximity detection sensor is configured to automatically transmit a signal to a nearby display, feature, attraction of other locations within an amusement park. When a user holding the device nears a display, feature, or attraction, the device automatically transmits a unique beacon, which is received by the feature thereby illuminating it or producing microbubbles in a predetermined manner unique to the beacon.

In addition, the switch 40 is configured to be a software or remote signal-controlled switch that is controlled by an internal controller and related circuitry of the device 10. Accordingly, the features of the device are communicatively activated by a remote device in that illumination of the LEDS and/or microbubble production is activated remotely via a remote signal. This remote includes but is not limited to a remote from the device, a remote control, computer, tablet, smartphone, other smart device, sound device, public address (PA) system, audio system, amplifier system, or one or more speakers. Where present, the remote-control device, which may be defined as an electronic device used to wirelessly control another electronic device, may include a button or other signal that when initiated may send a signal to the communication for receiver device located in the tracking apparatus or other control electronics of the device. The controlling, executing, or operating software application when instructed sends a signal from the communication transmitter/receiver, located in the control device, to a device tracking apparatus. The tracking apparatus may, in addition, or place thereof, include various control electronics such as PCB, microcontroller, microprocessor, memory and associated electronics such as transmitters, receivers, GPS, blue tooth communication systems, separate controllers, WiFi communication subsystems and the like. The associated memory may further include stored instructions to control and operate the various features hereof, including stored audio files, video files, pre-recorded materials and illumination cycles and shows as well as other necessary instructions to implement the features outlined herein. As well, such control electronics may be alternatively located within the housing and separate from the features of the tracking apparatus. In some embodiments, a single PCB may combine all features and structures/electronics/circuits. In other implementations, such features may be separately implemented.

AS shown in FIG. 5, the device 10 also includes a two-way communication capability, including a receiver 63 and transmitter 75 that is coupled to the integrated circuit 47, all of which is secured within the housing 50. Accordingly, the switch or other circuitry incorporates activation through embedded instructions and or receipt of activation signals received by a receiver and related circuitry. Accordingly, signals are sent to and from the device, for instance from a fixture via user input, for instance with a press of the switch 40. When a user presses the switch, one mode includes sending a wireless signal to another device, fixture, etc. The transmitter and receiver wirelessly communicate utilizing standard methods, such as Wi-Fi, Infrared communication “IR”, radio-frequency identification “RFID”, Bluetooth®, etc. In operation, a signal is sent from the device to a fixture, which is a life-sized version of the device and/or is a different shape but includes the elements described herein necessary to create microbubbles but on a larger scale. When a user presses a button on the device, it transmits a unique signal to the microbubble producing fixture. This unique signal is received by a receiver within the fixture, which instructs the integrated circuit to unlock and trigger a unique effect or feature from the fixture. Simultaneously, the fixture sends a signal back to the device to unlock a congruent or distinct feature in the device. For example, it is like a lock and key system, whereby the signal sent by the device unlocks the lock within the fixture. This unlocking not only triggers an effect within the fixture but unlocks the unique signal that is sent back to the device.

As shown in FIG. 4, the shaft includes wiring 45 that connects the power source to the electrical/electronic components of the device 10, most of which are secured within the housing 50. As shown in FIGS. 1, 2 and 4, a bottom portion of the housing forms a shelf 44 to which the housing connects. The bottom portion of the housing includes a front 41 and back portion 43 that secure together when combined around the shaft, for instance via extending portions that are configured to secure around the shaft. The base acts as a support for the contents of the housing 50.

As shown in FIGS. 1, 2 and 4, the housing can include one monolithic piece of material, made, for example, of plastic, or includes a front 51 and back 53 casing that are secured together, for example by screws. The front cover includes a decorative face 55 that is interchangeable with different patterns and aids in easy access to the inner contents of the housing for repairs and maintenance. The housing can be any shape or size. Enclosed within the housing is a capillary bubble system 60, which includes the elements necessary for producing bubbles of the precise size to achieve a snow-like appearance. The capillary bubble system includes an enclosure 70, which houses a motor 62 that is electrically connected to a pump with a gearbox with various gears 65, 66, 67 and an air producing device 68 connected to an air duct 72. Connected to a top portion of the air duct is a microbubble emitter 80.

As shown in FIGS. 4-8, the enclosure 70 is secured to the inner walls of the housing 50, for instance via screws and retainers. The enclosure includes a front 73 and back cover 74 which secure together around the inner contents thereof. The enclosure is configured in any predetermined shape so that, when the covers are secured together, the various components are safely secured in place and do not shift or move when in use. Furthermore, the enclosure advantageously forms an additional barrier to prevent bubble solution from interfering with the electrical/electronic elements within the housing and/or device 10.

The motor 62 can be any type of motor and is connected on one end to the gearbox of the pump 64 via a worm gear 69 and another end to the air producing device 68. The motor used produces the amount of energy needed to create the precise number of rotations necessary to generate the desired quantity of microbubbles. Further, the motor must also be capable of generating the necessary airflow velocity to create the desired quantity of microbubbles.

To further aid in producing the desired size and quantity of microbubbles is the type of pump 64 used, which is preferably a peristaltic pump. As shown in FIG. 5, the pump includes a which includes a plurality of gears 65, 66, 67. A particular number of gears are used to control the speed of the pump to produce the drip rate necessary to produce the correct number of microbubbles per minute. The pump operates in combination with the gearbox, which draws the microbubble-producing solution from the solution reservoir 20 through the solution input channel 26. The channel extends from the reservoir, through the shaft 30 and the gearbox and pump and connects to a nozzle 96 secured through the chassis 82 of the bubble emitter 80.

Figure 6:
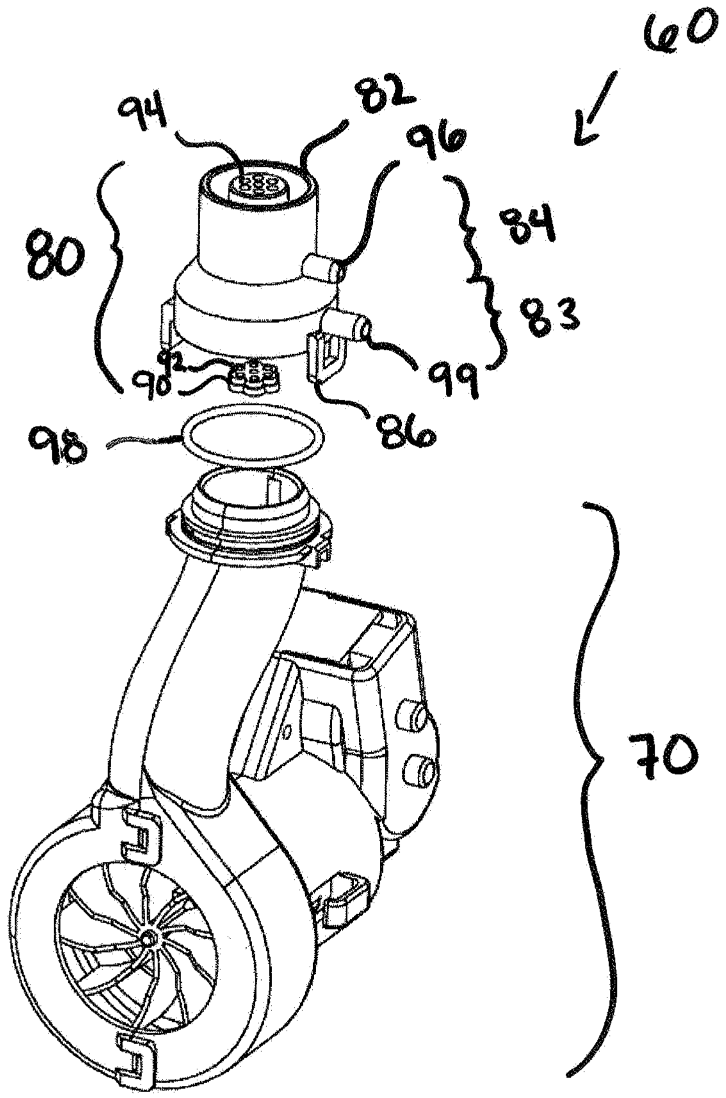
FIG. 6 is a side, perspective view of the capillary bubble system with a partially exploded view of the microbubble emitter of the device shown in FIG. 1.
Figure 7:
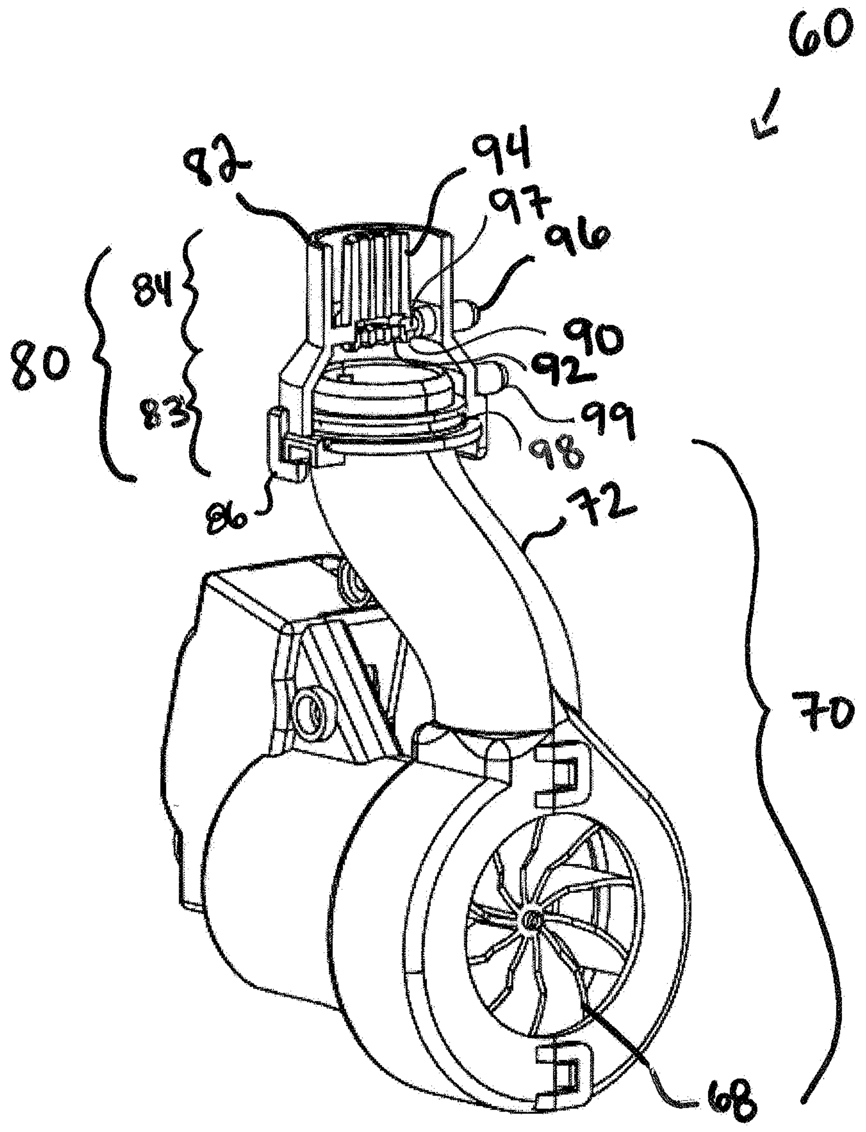
FIG. 7 a back, perspective view of the capillary bubble system with an open-faced view of the microbubble emitter of the device shown in FIG. 1.
Figure 8:
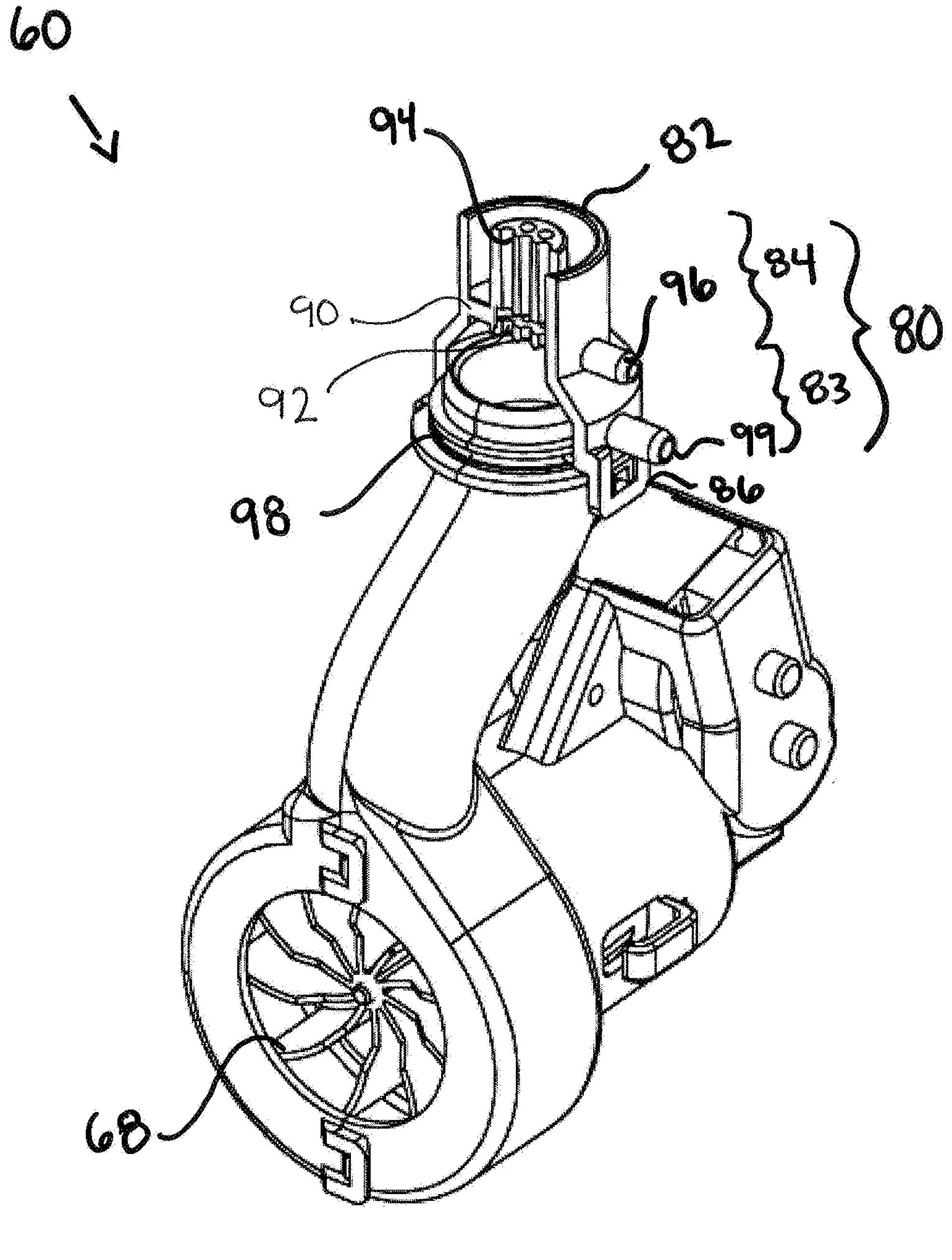
FIG. 8 a further side, perspective view of the capillary bubble system with an open-faced view of the microbubble emitter of the device shown in FIG. 1.

As shown in FIG. 5, the motor 62 is electrically connected to the air producing device 64, for example via a peg 71. The air-producing device can be any device, such as a fan, that produces an airstream with the precise velocity needed to push the solution through the bubble emitter 80. As shown in FIGS. 6-8, a top portion of the enclosure 70 forms a hollow air duct 72, which is curved. The air duct has an open-top to which the microbubble emitter connects. In use, the motor powers the rotation of the fan, which produces air that is pushed upward through the duct.

As shown in FIGS. 6-8, the air duct 72 is hollow and secured to the open-top thereof is the microbubble emitter 80. More specifically, the microbubble emitter includes a chassis 82, which is hollow and includes a lower portion 83 and an upper portion 84. The lower portion is wider in diameter than the upper portion. More specifically, the diameter of the air duct and the diameter of the upper portion are similar or identical in size. Thus, air produced from the air-producing device 68 blows upwardly through the entire inner diameter of the upper portion of the microbubble emitter. This configuration aids in producing the desired number of microbubbles. Further, the precise calibration of drip rate per minute prevents the device from clogging due to the overproduction of the solution. The lower portion includes hooks 86, which clasp onto an outer edge of the air duct securing it thereto. The lower portion also includes a nozzle 99 for the connection of the recirculation solution channel 29, which is discussed further herein.

As shown in FIGS. 7-8, secured within the inside of the hollow upper portion 84 of the microbubble emitter 80 is a shelf 90. The shelf is secured horizontally to an inner wall of the upper portion and includes multiple orifices 92 therein. The shelf is preferably molded in place during manufacturing or is secured using conventional methods, such as glue or screws. Each orifice further includes a hollow tube 94 that extends upwardly therefrom. These extending hollow tubes may be separate from one another, or as shown in FIGS. 7 and 8, may form a combined piece wherein each tube is separate from one another. The number of orifices and hollow tubes varies and is not limited. For optimal microbubble production, there are preferably about 5-7 orifices within the shelf and the same number of corresponding tubes extending therefrom. In the embodiment of the device 10, there are preferably eight orifices and eight hollow tubes extending therefrom. The size of each orifice varies but is from about 1 mm to 5 mm, but is preferably about 1 mm. Therefore, the size of the microbubbles emitted is from about 1 mm to 10 mm. Advantageously, the combination of the precise drip rate of the microbubble-producing solution onto the precisely sized orifices being pushed through the extending tubes with the precise velocity of air created microbubbles that resemble snow. Moreover, the precise drip rate prevents clogging within the device as the size of the orifices is small. The precise drip rate combined with the precise velocity of air prevents the device from clogging and becoming non-functional.

As shown in FIGS. 6-8, secured through the wall of the upper portion 84 of the microbubble emitter 80 is a nozzle 96. As shown in FIG. 4, the solution input channel 26 secures around this nozzle, for instance by friction fit or glue. As shown in FIGS. 7-8, the nozzle extends through the chassis and connects adjacent to, preferably atop, the shelf 90. The nozzle can be one piece or, as shown in FIG. 7, a spout 97 is connected between the nozzle and the shelf inside the upper portion. The spout is a smaller diameter than the nozzle, thereby aiding in the precise drip rate of the solution onto the orifices 92 of the shelf. Each drip of microbubble-producing solution ideally covers the entirety of the shelf, thereby covering each orifice thereon with a precise amount of water surface tension to create a film. In use, solution is pumped from the solution reservoir 20 via the solution input channel 26 through the shaft 30, the contents of the enclosure 70, the nozzle and drips out the spout onto the orifices of the shelf. This drip is constantly creating a film on the orifices, which film is pushed upward by air from the air-producing device 68. When the air-producing device is activated, air flows upwardly through the air duct 72, which pushes the film upward through the hollow tubes 94 and out the top of the device to create microbubbles. To further aid in pushing the bubbles out of the top of the device 10, the air is also pushed upwardly around the outside of the shelf and corresponding hollow tubes. This process of creating microbubbles is advantageous as it does not require a wiper mechanism or a chopping feature to create such small bubbles that have the appearance of snow. Therefore, there are far fewer maintenance issues with this device and the device is safer for children to use.

As shown in FIGS. 5 and 6, the microbubble emitter 80 also includes a trough 96 located within the chassis 82, preferably below the shelf 90. This trough collects any excess solution that drips downwardly through the orifices 80 of the shelf 90. This trough is angled toward a nozzle 99 that connects to the recirculation channel 29. The excess solution is then pumped back into the solution reservoir where it is recycled through the device 10.

It is well recognized by persons skilled in the art that alternative embodiments to those disclosed herein, which are foreseeable alternatives, are also covered by this disclosure. The foregoing disclosure is not intended to be construed to limit the embodiments or otherwise to exclude such other embodiments, adaptations, variations, modifications and equivalent arrangements.

The invention claimed is:

1. A microbubble-producing device comprising:
a shaft comprising a first and second end;
a microbubble-producing solution reservoir connected to the first end of the shaft;
a housing connected to the second end of said shaft, wherein the housing contains a motor, a pump, and an air producing device;
control circuitry secured within the housing, wherein the circuitry includes a wireless communication system, wherein microbubble production of the device is configured to activate when a unique signal is received from a fixture;
an air duct comprising a first and second end, wherein the first end is connected to said air producing device;
a microbubble emitter comprising a first and a second end, wherein the first end is secured to the second end of the duct and the emitter comprises a wall surrounding a hollow interior;
a shelf secured within the hollow interior, wherein the shelf contains eight 1 mm sized orifices;
eight hollow tubes secured to the eight orifices, wherein each of the tubes extends to the second end of the emitter, and
a channel comprising a tubular structure with a first and second end, wherein the first end is submerged within the microbubble-producing solution reservoir and the second end is connected to the shelf through the wall of the emitter.

2. The microbubble-producing device of claim 1, wherein the shelf occupies a portion of the hollow interior.

3. The microbubble-producing device of claim 1, further comprising a recirculation channel comprising a tubular structure with a first and second end, wherein the first end is connected to the shelf through the wall of the emitter and the second end is connected to the microbubble-producing solution reservoir.

4. The microbubble-producing device of claim 1, wherein the housing further contains LEDs secured therein.

5. The microbubble-producing device of claim 1, wherein secured to the second end of the channel is a nozzle with a smaller diameter than the channel, wherein the nozzle connects to the shelf.

6. The microbubble-producing device of claim 1, wherein the device is capable of producing microbubbles having a size of from 1 mm to 10 mm.

7. The microbubble-producing device of claim 1, wherein the motor, pump and air producing device are secured within an enclosure secured to an inside surface of the housing.

8. The microbubble producing device of claim 1, wherein the size of each of the hollow tubes is 1 mm.

9. The microbubble producing device of claim 1, wherein the wireless s communication system includes a receiver and transmitter.

10. The microbubble producing device of claim 4, wherein the LEDs are configured to illuminate when the unique signal is received from the fixture.

11. A microbubble-producing device comprising:
a shaft comprising a first and second end;
a microbubble-producing solution reservoir connected to the first end of the shaft;
a housing connected to the second end of the shaft, wherein said housing contains a motor, a pump, and an air producing device;
control circuitry secured within the housing, wherein the circuitry includes a wireless communication system configured to activate microbubble production of the device when a signal is received within a proximity of the device;
an air duct comprising a first and second end, wherein the first end is connected to the air producing device;
a microbubble emitter comprising a first and a second end, wherein the first end is secured to the second end of the duct and the emitter comprises a wall surrounding a hollow interior;
a shelf secured within the hollow interior, wherein the shelf contains five to seven 1 mm sized orifices;
five to seven hollow tubes secured to the five to seven orifices, wherein each of the tubes extend to the second end of the emitter; and
a channel comprising a tubular structure with a first and second end, wherein said first end is submerged within said microbubble-producing solution reservoir and said second end is connected to said shelf through said wall of said emitter.

12. The microbubble-producing device of claim 11, wherein said shelf occupies a portion of the hollow interior.

13. The microbubble-producing device of claim 11, wherein the housing further contains LEDs secured therein.

14. The microbubble-producing device of claim 11, wherein secured to the second end of the channel is a nozzle with a smaller diameter than the channel, wherein the nozzle connects to the shelf.

15. The microbubble-producing device of claim 11, wherein the device is capable of producing microbubbles having a size of from 1 mm to 10 mm.

16. The microbubble-producing device of claim 11, further comprising a recirculation channel comprising a tubular structure with a first and second end, wherein the first end is connected to the shelf through the wall of the emitter and the second end is connected to the microbubble-producing solution reservoir.

17. The microbubble producing device of claim 11, wherein the size of each of the separate hollow tubes is 1 mm.

18. The microbubble producing device of claim 13, wherein the wireless communication system is further configured to activate the LEDs when the signal is received.

19. A microbubble-producing device comprising:
a shaft comprising a first and second end;
a microbubble-producing solution reservoir connected to the first end of the shaft;
a housing connected to the second end of said shaft, wherein the housing contains a motor, a pump, and an air producing device;
control circuitry secured within the housing, wherein the circuitry includes a two-way wireless communication system configured to communicate with a fixture to simultaneously activate microbubble production in the device and fixture;
an air duct comprising a first and second end, wherein the first end is connected to said air producing device;
a microbubble emitter comprising a first and a second end, wherein the first end is secured to the second end of said duct and the emitter comprises a wall surrounding a hollow interior;
a shelf secured within the hollow interior, wherein the shelf contains eight 1 mm sized orifices;
eight hollow tubes secured to the eight orifices, wherein each of the tubes extends to the second end of the emitter, and a channel comprising a tubular structure with a first and second end, wherein the first end is submerged within the microbubble-producing solution reservoir and the second end is connected to the shelf through the wall of the emitter.

20. The microbubble-producing device of claim 19, wherein the size of each of the hollow tubes is 1 mm.

* * * * *